United States Patent
Kroehling (10) Patent No.: US 11,102,188 B2
(45) Date of Patent: Aug. 24, 2021

(54) MULTI-TENANT ENTERPRISE APPLICATION MANAGEMENT

(71) Applicant: Red Hat, Inc., Raleigh, NC (US)

(72) Inventor: Juraci Paixao Kroehling, Munich (DE)

(73) Assignee: RED HAT, INC., Raleigh, NC (US)

(*) Notice: Subject to any disclaimer, the term of this patent is extended or adjusted under 35 U.S.C. 154(b) by 209 days.

(21) Appl. No.: 15/012,487

(22) Filed: Feb. 1, 2016

(65) Prior Publication Data
US 2017/0222997 A1    Aug. 3, 2017

(51) Int. Cl.
*H04L 29/06*   (2006.01)

(52) U.S. Cl.
CPC .......... *H04L 63/08* (2013.01); *H04L 63/101* (2013.01)

(58) Field of Classification Search
CPC ........ H04L 63/08; H04L 63/102; H04L 67/42
USPC .......................................................... 726/24
See application file for complete search history.

(56) References Cited

U.S. PATENT DOCUMENTS

| | | | | |
|---|---|---|---|---|
| 6,707,567 B1* | 3/2004 | Suzuki | ............... | G06F 11/3476 358/1.15 |
| 7,089,584 B1* | 8/2006 | Sharma | ............... | G06F 21/335 709/203 |
| 7,284,271 B2* | 10/2007 | Lucovsky | ............ | G06F 21/6218 726/18 |
| 7,421,472 B1* | 9/2008 | Ross, Jr. | ................ | G06Q 10/10 709/206 |
| 7,451,484 B1* | 11/2008 | Nadalin | ................. | G06F 21/31 726/19 |
| 7,930,559 B1* | 4/2011 | Beaverson | .......... | G06F 11/1453 713/193 |

(Continued)

FOREIGN PATENT DOCUMENTS

| | | |
|---|---|---|
| CN | 105183820 | 12/2015 |
| WO | WO-2010040378 A1 * 4/2010 | ......... H04L 63/0815 |

OTHER PUBLICATIONS

Merz, "The Management of Users, Roles, and Permissions in JDOSecure", PPPJ 2006,. Aug. 30-Sep. 1, 2006, Germany, 2006, pp. 85-93.*

(Continued)

*Primary Examiner* — Luu T Pham
*Assistant Examiner* — Walter J Malinowski
(74) *Attorney, Agent, or Firm* — Haynes and Boone, LLP (57) ABSTRACT

A method performed by a computing system includes receiving from a client component of an enterprise application, a request destined for a service component of the enterprise application, the request comprising authentication data and request data, the authentication data being associated with a current user of the client component, the user associated with an organization. The method further includes performing an authentication process to create principal data and role data associated with the request, the principal data identifying a user. The method further includes using the authentication data and request data, determining a current tenant of the client component. The method further includes replacing the principal data with updated principal data, the updated principal data identifying the organization. The method further includes updating the role data associated with the request to create updated role data that indicates roles of the user within the organization.

19 Claims, 5 Drawing Sheets

(56) References Cited

U.S. PATENT DOCUMENTS

| | | | | |
|---|---|---|---|---|
| 7,966,369 B1* | 6/2011 | Briere | G06Q 10/10 | 707/616 |
| 8,051,168 B1* | 11/2011 | Boysko | G06F 21/31 | 709/218 |
| 8,214,257 B1* | 7/2012 | Folk | G06Q 20/20 | 235/379 |
| 8,706,692 B1* | 4/2014 | Luthra | G06F 17/30575 | 707/622 |
| 8,850,041 B2 | 9/2014 | Appiah et al. | | |
| 8,949,939 B2 | 2/2015 | Peddada | | |
| 9,043,458 B2 | 5/2015 | Balaji et al. | | |
| 9,189,355 B1* | 11/2015 | Moturu | G06F 11/301 | |
| 9,432,379 B1* | 8/2016 | Roche | H04L 63/08 | |
| 9,608,809 B1* | 3/2017 | Ghetti | H04L 9/083 | |
| 9,626,137 B2* | 4/2017 | Mihara | G06F 3/1222 | |
| 9,934,394 B1* | 4/2018 | Stolboushkin | G06F 21/6218 | |
| 9,992,186 B1* | 6/2018 | Drozd | H04L 63/0807 | |
| 10,044,723 B1* | 8/2018 | Fischer | H04L 63/0807 | |
| 10,211,977 B1* | 2/2019 | Roth | H04L 9/08 | |
| 2002/0029163 A1* | 3/2002 | Joao | G06Q 10/10 | 705/12 |
| 2002/0165877 A1* | 11/2002 | Malcolm | G06F 17/243 | 715/223 |
| 2002/0178119 A1* | 11/2002 | Griffin | G06F 21/604 | 705/54 |
| 2003/0149744 A1* | 8/2003 | Bierre | G06K 9/00885 | 709/217 |
| 2003/0217285 A1* | 11/2003 | Sanchez Herrero | H04L 12/2898 | 726/12 |
| 2004/0215502 A1* | 10/2004 | Takahashi | G06Q 10/0639 | 705/7.38 |
| 2005/0188421 A1* | 8/2005 | Arbajian | G06F 21/6227 | 726/4 |
| 2006/0034237 A1* | 2/2006 | Patrick | H04L 67/14 | 370/338 |
| 2006/0117015 A1* | 6/2006 | Bisbee | G06F 21/33 | |
| 2007/0022289 A1* | 1/2007 | Alt | H04L 63/0272 | 713/168 |
| 2007/0064912 A1* | 3/2007 | Kagan | H04M 3/5237 | 379/265.1 |
| 2007/0174390 A1* | 7/2007 | Silvain | G06Q 10/10 | 709/204 |
| 2007/0199047 A1* | 8/2007 | Gibart | G06F 21/32 | 726/2 |
| 2008/0263058 A1* | 10/2008 | Peden | G06Q 10/10 | |
| 2009/0037431 A1* | 2/2009 | Martino | G06Q 30/02 | |
| 2009/0183244 A1* | 7/2009 | Saraf | G06F 21/604 | 726/6 |
| 2009/0270049 A1* | 10/2009 | Zhao | H04L 29/12122 | 455/90.2 |
| 2009/0326995 A1* | 12/2009 | Sorisi | G06Q 30/02 | 705/7.33 |
| 2009/0327401 A1* | 12/2009 | Gage | G06F 15/16 | 709/203 |
| 2010/0088234 A1* | 4/2010 | Moore | G06F 21/62 | 705/52 |
| 2010/0115577 A1* | 5/2010 | Ratnala | G06F 21/604 | 726/1 |
| 2010/0161993 A1* | 6/2010 | Mayer | G06F 21/64 | 713/178 |
| 2010/0198730 A1* | 8/2010 | Ahmed | G06F 17/30528 | 705/50 |
| 2010/0235856 A1* | 9/2010 | Huang | H04L 65/104 | 725/25 |
| 2010/0250603 A1* | 9/2010 | Balakrishnaiah | G06F 21/577 | 707/781 |
| 2010/0325684 A1 | 12/2010 | Grebenik et al. | | |
| 2011/0252339 A1* | 10/2011 | Lemonik | G06F 17/2288 | 715/753 |
| 2011/0296499 A1* | 12/2011 | Knjazihhin | G06F 21/604 | 726/4 |
| 2012/0110087 A1* | 5/2012 | Culver | G06F 17/5004 | 709/205 |
| 2012/0151063 A1* | 6/2012 | Yang | H04L 49/90 | 709/226 |
| 2012/0167234 A1* | 6/2012 | Donfried | G06F 21/31 | 726/29 |
| 2012/0198512 A1* | 8/2012 | Zhou | H04L 47/122 | 726/1 |
| 2012/0209997 A1* | 8/2012 | Duan | G06Q 30/00 | 709/224 |
| 2012/0240214 A1* | 9/2012 | Ogura | G06F 21/31 | 726/12 |
| 2013/0047247 A1* | 2/2013 | Matsuda | G06F 21/335 | 726/9 |
| 2013/0051361 A1* | 2/2013 | Yokoyama | H04W 76/40 | 370/331 |
| 2013/0074091 A1* | 3/2013 | Xavier | G06F 9/5011 | 718/104 |
| 2013/0091355 A1* | 4/2013 | Lear | H04L 63/02 | 713/168 |
| 2013/0159049 A1* | 6/2013 | Arumugam | G06Q 10/063 | 705/7.28 |
| 2013/0159063 A1 | 6/2013 | Fessler et al. | | |
| 2013/0212101 A1* | 8/2013 | Okuno | G06F 16/9535 | 707/736 |
| 2013/0232539 A1* | 9/2013 | Polunin | G06Q 10/047 | 726/1 |
| 2013/0247142 A1* | 9/2013 | Nishizawa | G06F 21/604 | 726/1 |
| 2014/0053280 A1* | 2/2014 | Durazzo | H04L 63/0281 | 726/28 |
| 2014/0068714 A1* | 3/2014 | Ono | H04L 63/083 | 726/3 |
| 2014/0082033 A1* | 3/2014 | Meriwether | G06F 16/86 | 707/827 |
| 2014/0101299 A1* | 4/2014 | Cherel | G06F 9/468 | 709/223 |
| 2014/0122576 A1* | 5/2014 | Ohkuma | H04L 67/10 | 709/203 |
| 2014/0172944 A1* | 6/2014 | Newton | H04L 41/0869 | 709/202 |
| 2014/0229739 A1* | 8/2014 | Roth | G06F 21/6218 | 713/189 |
| 2014/0244402 A1* | 8/2014 | Binas | G06F 3/0481 | 705/14.69 |
| 2014/0257998 A1* | 9/2014 | Jimison | G06Q 30/0277 | 705/14.69 |
| 2014/0278526 A1* | 9/2014 | Thakkar | G06F 19/322 | 705/3 |
| 2014/0280948 A1 | 9/2014 | Schmidt et al. | | |
| 2014/0337466 A1* | 11/2014 | Li | H04L 63/0407 | 709/217 |
| 2014/0365426 A1* | 12/2014 | Brown | G06Q 10/10 | 707/608 |
| 2015/0026245 A1* | 1/2015 | Jansen | H04L 67/42 | 709/203 |
| 2015/0033297 A1* | 1/2015 | Sanso | H04L 63/104 | 726/5 |
| 2015/0046985 A1* | 2/2015 | D'Souza | H04L 63/08 | 726/4 |
| 2015/0100698 A1* | 4/2015 | Valbuena | H04L 41/5051 | 709/226 |
| 2015/0128231 A1* | 5/2015 | Nakajima | G06F 21/45 | 726/5 |
| 2015/0149919 A1* | 5/2015 | Matsuishi | H04N 1/00509 | 715/739 |
| 2015/0205974 A1* | 7/2015 | Talley | G06F 11/2094 | 707/781 |
| 2015/0215315 A1* | 7/2015 | Gordon | H04L 63/0884 | 726/5 |
| 2015/0229638 A1* | 8/2015 | Loo | H04L 63/029 | 726/9 |
| 2015/0256862 A1* | 9/2015 | Fragale | H04N 21/2541 | 725/54 |

(56) References Cited

U.S. PATENT DOCUMENTS

| | | | | |
|---|---|---|---|---|
| 2015/0269702 | A1* | 9/2015 | Miasnik | G06Q 50/265 705/325 |
| 2015/0310188 | A1* | 10/2015 | Ford | G06F 21/10 726/28 |
| 2015/0358331 | A1* | 12/2015 | Rachalwar | H04L 63/105 726/7 |
| 2015/0379257 | A1* | 12/2015 | Ahmed | G06F 21/31 726/19 |
| 2015/0379293 | A1* | 12/2015 | Wang | G06F 16/951 726/7 |
| 2016/0057150 | A1* | 2/2016 | Choi | H04L 63/102 726/1 |
| 2016/0080395 | A1* | 3/2016 | Reddy | H04L 63/1425 726/23 |
| 2016/0149882 | A1* | 5/2016 | Srivastava | H04L 51/046 726/4 |
| 2016/0162697 | A1* | 6/2016 | Follis | H04L 9/3247 726/28 |
| 2016/0217413 | A1* | 7/2016 | Coombes | G06Q 10/063114 |
| 2016/0218938 | A1* | 7/2016 | Gupte | H04L 41/5025 |
| 2016/0342700 | A1* | 11/2016 | Goad | H04W 4/22 |
| 2017/0011079 | A1* | 1/2017 | Verma | G06F 17/30321 |
| 2017/0034177 | A1* | 2/2017 | Narasimhan | H04L 63/101 |
| 2017/0187716 | A1* | 6/2017 | Neal-Joslin | H04L 12/6418 |
| 2017/0236188 | A1* | 8/2017 | Puck | G06Q 30/0635 705/26.81 |
| 2017/0242881 | A1* | 8/2017 | Northfleet | G06F 17/30339 |
| 2017/0310627 | A1* | 10/2017 | Pulla | H04L 51/22 |

OTHER PUBLICATIONS

Moyer, "Service Portability of Networked Appliances", IEEE Communications Magazine, Jan. 2002, pp. 116-121.*

Bindiganavale, "Role Based Access Control in Enterprise Application—Security Administration and User Management", IEEE, 2006, pp. 111-116.*

Bien, "Hierarchical Multi-Tenant Pattern", IEEE, 2014, pp. 157-164.*

Mietzner, "Combining Different Multi-Tenancy Patterns in Service-Oriented Applications", University of Stuttgart, Proceedings of the 13th IEEE Enterprise Distributed Object Conference (EDOC 2009), 11 pages.*

Kern, Axel, Andreas Schaad, and Jonathan Moffett. "An administration concept for the enterprise role-based access control model." In Proceedings of the eighth ACM symposium on Access control models and technologies, pp. 3-11. 2003. (Year: 2003).*

Felkner, Anna, and Adam Kozakiewicz. "More practical application of trust management credentials." In 2015 Federated Conference on Computer Science and Information Systems (FedCSIS), pp. 1125-1134. IEEE, 2015. (Year: 2015).*

"Multitenancy and Nested Set Trees" http://programmers.stackexchange.com/questions/273040/multitenancy-and-nested-set-trees. accessed Jan. 29, 2016, 2 pgs.

"The Force.com Multitenant Architecture" https://developer.salesforce.com/page/Multi_Tenant_Architecture, accessed Jan. 2016, 18 pgs.

"Fusion Middleware System Administrator's Guide for Oracle Business Intelligence Enterprise Edition" https://docs.oracle.com/cd/E28280_01/bi.1111/e10541/configtenant.htm#BIESG9077, accessed 2016, 11 pgs.

* cited by examiner

MULTI-TENANT ENTERPRISE APPLICATION MANAGEMENT

BACKGROUND

The present disclosure relates generally to enterprise applications, and more particularly, mechanisms for managing multiple tenants in an enterprise application.

Enterprise applications are pieces of software that are designed to service an entire organization rather than a single individual. Thus, enterprise applications are designed to be used by multiple users with different roles. User access to an enterprise application is typically modeled after one of two main tenancy modes, particularly, a multi-tenant mode and a single tenant mode. In the multi-tenant mode, each user acts as a tenant. Users may create their own resources and are allowed to manage those resources. Thus, it may be sufficient to restrict resources to the users who create those resources. In the single tenant mode, multiple users are associated with a single tenant. Each user may have defined roles to determine what permissions a user has for a particular resource. All resources, however, belong to the single tenant, which is typically associated with an organization.

Some enterprise applications are configured to operate in either of the two tenancy modes. In other words, such an enterprise application may be instantiated as either a single tenant enterprise application or a multi-tenant application. Such enterprise applications add additional complexity for the service components associated with such enterprise applications. A service component may be, for example, a portion of the enterprise application that provides services to various client components of the enterprise application. The increased complexity is due to the fact that the service component not only accounts for user A with role B for resource C, but the service component accounts for user A with role B on tenant D for resource C. This complexity may lead to errors in code that forms the business components. Such errors may lead to security vulnerabilities and allow malicious users to gain access to data to which they should not have access. Thus, it is desirable to have methods for managing such multi-tenant enterprise applications to avoid such errors.

SUMMARY

According to one example, a method performed by a computing system includes receiving from a client component of an enterprise application, a request destined for a service component of the enterprise application, the request comprising authentication data and request data, the authentication data being associated with a current user of the client component, the user associated with an organization. The method further includes performing an authentication process to create principal data and role data associated with the request, the principal data identifying a user. The method further includes using the authentication data and request data, determining a current tenant of the client component. The method further includes replacing the principal data with updated principal data, the updated principal data identifying the organization. The method further includes updating the role data associated with the request to create updated role data that indicates roles of the user within the organization.

According to one example, a computing system includes a processor and a memory, the memory comprising machine readable instructions that when executed by the processor, cause the system to: receive from a client component of an enterprise application, a request destined for a service component of the enterprise application, the request comprising authentication data and request data, the authentication data being associated with a current user of the client component, the user associated with an organization, the request being sent on behalf of the organization. The system is further to perform an authentication process to create principal data and role data associated with the request, the principal data identifying a user. The system is further to use the authentication data and request data, determining a current tenant of the client component. The system is further to replace the principal data with updated principal data, the updated principal data identifying the organization. The system is further to update the role data associated with the request to create updated role data that indicates roles of the user within the organization.

According to one example, a method includes receiving a request from a client component of an enterprise application, the request comprising authentication data and request data, the authentication data being associated with a current user of the client component, the user associated with an organization. The method further includes using authentication data created from an authentication process to determine a current tenant of the client component, the authentication data including performing principal data and role data associated with the request, the principal data identifying a user. The method further includes replacing the principal data with updated principal data, the updated principal data identifying the organization. The method further includes updating the role data associated with the request to create updated role data that indicates roles of the user within the organization.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to design, construct, and manage multi-tenant enterprise applications in a manner that simplifies the application and thereby reduces the likelihood of vulnerabilities. According to principles described herein, a multi-tenant enterprise application is designed, constructed, and managed such that the service components do not have to be aware of the underlying tenant structure. Instead, the service components receive requests that indicate the organization rather than the user. Additionally, the requests include role data associated with the user who sent the request on behalf of the organization instead of role data for the organization as a whole. Thus, without concern for the underlying tenant structure, the service components can be designed more simply and efficiently. The more simple and efficient design may reduce the likelihood of vulnerabilities.

Figure 1:
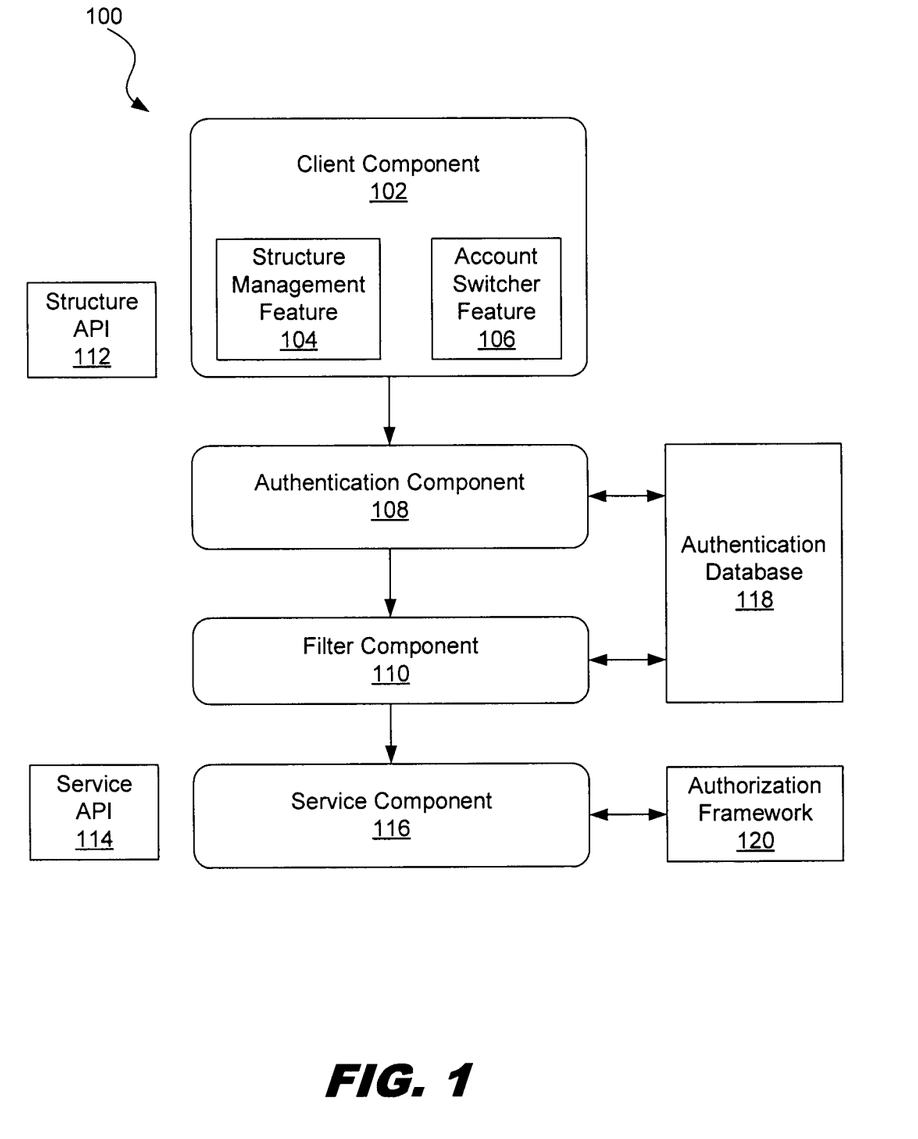
FIG. 1 is a diagram showing illustrative components of an enterprise application, according to one example of principles described herein.

FIG. 1 is a diagram showing illustrative components 102, 108, 110, 116 of an enterprise application 100. According to the present example, the enterprise application 100 includes a client component 102, an authentication component 108, a filter component 110, and a service component 116. The various components 102, 108, 110, 116 may utilize an authentication database 118 and an authorization framework 120. The client component 102 includes a structure management feature 104 and an account switcher feature 106. The enterprise application 100 may be associated with a structure Application Programming Interface (API) 110 and a service API 112.

Enterprise applications may be structured with client components 102 and service components 116, which are sometimes referred to as business components. The client components 102 typically run on computing systems owned by real world organizations (such as corporations or governments). In some cases, however, the client components 102 may run on third-party computing systems that are made available to the real world organizations. The service components 116 typically run on servers that are made available to the various instantiations of the client components 102. Thus, the service components 116 may store and process data for a variety of different real world organizations, each organization using their own instantiation of the client component 102 of the enterprise application 100.

In the present example, the client component 102 includes a structure management feature 104. The structure management feature 104 may be provided as a user interface component available to certain authorized users of the enterprise application 100. The structure management feature 104 allows for the establishment and management of the organizations and users. For example, a first user may register into the enterprise application 100. The first user may then create an organization. The organization may be representative of a real world organization. The first user may be a "Super User" for the organization. This means that the first user can perform any operation on the resources associated with the organization. The first user may also invite other users to be associated with the organization. For example, the first user may invite a second user and assign a role to that second user. The role defines what actions the second user may perform on behalf of the organization. In the present example, the second user may be assigned an "Auditor" role. Such a role allows the second user to view but not perform operations on resources. The first user may also create resources on behalf of the organization. In some examples, the structure management feature 104 is integrated with enterprise application 100. In some examples, however, the structure management feature 104 is separate from the enterprise application 100 but works with the enterprise application 100.

In the present example, the client component 102 also includes an account switcher feature 106. The account switcher feature 106 may be provided as a user interface component of the enterprise application. The account switcher feature 106 allows users to define the organization on behalf of which requests are to be made. For example, the first user, who has a super user role, may use the account switcher feature 106 to set the organization as the current organization on behalf of which requests are to be made. In other words, the organization then becomes the current tenant of the enterprise application 100. The first user may then create a first resource. Because the first user is acting on behalf of the organization, the resource is owned by the organization. When the second user uses the account switcher feature 106 to indicate that he or she is acting on behalf of the organization, the second user may only be able to view but not perform operations on, the resource created by the first user on behalf of the organization. As will be explained in further detail below, the second user may have different privileges when acting on behalf of a different organization. In some examples, the account switcher feature 106 is integrated with enterprise application 100. In some examples, however, the account switcher feature 106 is separate from the enterprise application 100 but works with the enterprise application 100.

As requests are sent from the client component 102 to the service component 116, they pass through an authentication component 108. The authentication component 108 may include an authentication framework such as that provided by Java Authentication and Authorization Service (JAAS). The authentication component 108 uses credentials associated with the user to make sure that the user is in fact who he or she claims to be. Such credentials may include, for example, a username and password. The authentication component 108 may consult an authentication database 118. The authentication database 118 includes data that can be used to validate credentials.

After passing through the authentication component 108 the requests passes through the filter component 110. As will be described in further detail below, the filter component 110 modifies data created by the authentication component 108. As such, the service component 116 does not have to be concerned with the underlying organizational structure utilized by the client component 102. In some examples, the filter component 110 may be integrated with the authentication component 108. In some examples, the filter component 110 may run on the same physical system as the authentication component 108. In other examples, however, the filter component 110 may run on a different physical computing system than the authentication component 108. The filter component 110 may utilize a structure API 112 that allows components of the client component 102, such as the structure management feature 104, to exchange information with the filter component 110. The filter component 110 may also obtain information from the authentication database 118.

After passing through the filter component 110 the request is passed to the service component 116. The service component 116 processes the received request. The service component 116 may utilize an authorization framework 120 such as that provided by JAAS. In other words, the service component 116 ensures that the operations being requested are allowed based on the data provided by the authentication component 108. The service components 116 may include, for example, a Representational State Transfer (REST) server, an Enterprise JavaBeans (EJB) server, or a servlet.

The enterprise application 100 may be associated with a structure API 112 and a service API 114. In some examples, the APIs 112, 114 may be integrated into the enterprise application 100. In some examples, however, the APIs 112, 114 may be separate from the enterprise application 100. The structure API 112 may provide the framework for creating and modifying the structure of organizations within the enterprise application. The structure API 112 may also provide the framework for associating various users with the organizations. The structure API 112 may be made available to the various components 102, 108, 110, 116 as needed.

The service API 114 may provide the framework for the service component 116 to obtain additional information as needed. As mentioned above, the filter component 110 replaces the user identifier with an organization identifier. But, in some cases, it may be desirable for the service component 116 to know the identity of the user. For example, the request may involve sending an email on behalf of the user. Thus, the service component 116 may need to identify the user in order to process the requested operation.

Figure 2:
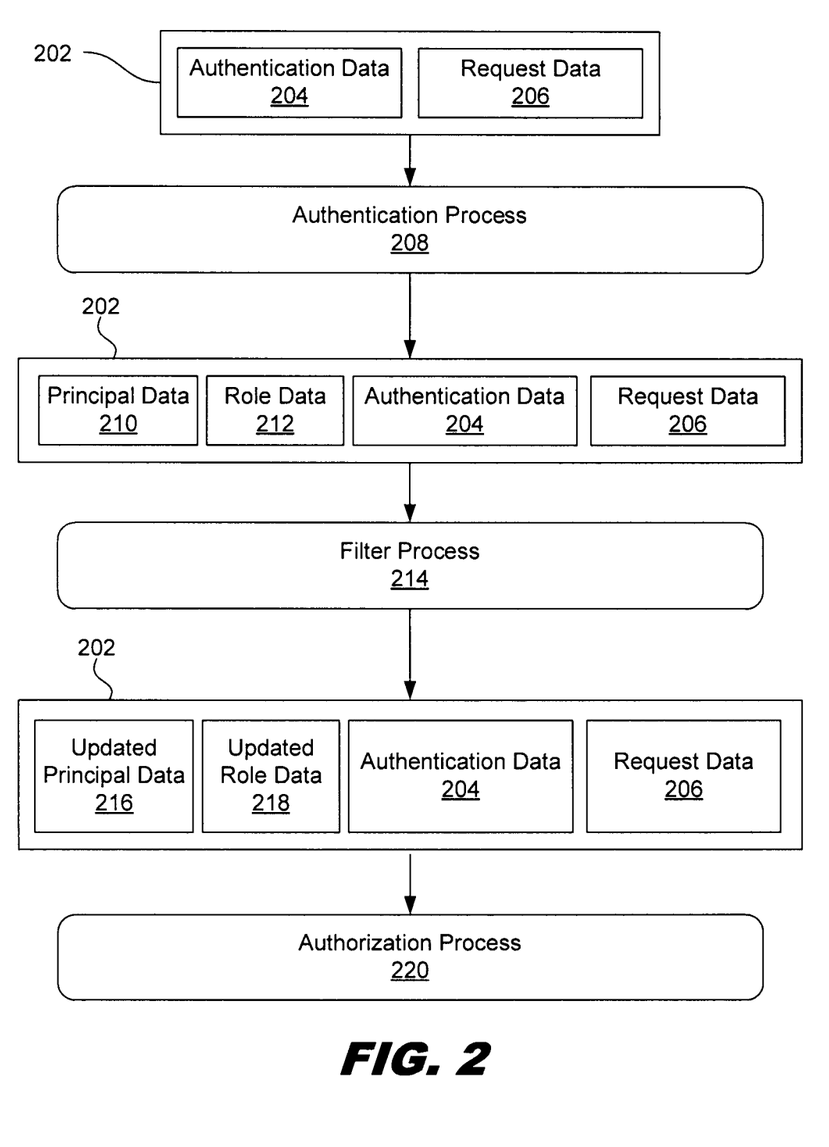
FIG. 2 is a diagram showing illustrative components involved in a request sent from a client component of the enterprise application to a service component of the enterprise application, according to one example of principles described herein.

FIG. 2 is a diagram showing illustrative components involved in a request 202 sent from a client component of the enterprise application to a service component of the enterprise application. According to the present example, a request 202 is sent from a client component (e.g., 102, FIG. 1) to a service component (e.g., 116, FIG. 1). The request 202 includes authentication data 204 and request data 206.

The authentication data 204 includes information used to authenticate the user and/or organization behind the request 202. Such information is used by an authentication framework such as JAAS. The authentication data 204 may include, for example, username and password. Typically, when a user logs into an enterprise application, he or she does so through a username and password. Such username and password may be attached to the request 202 as part of the authentication data 204.

The request data 206 includes information for the service component relating to a requested operation. For example, the request data 206 may identify a specific piece of data to be operated on and the specific type of operation to be performed on piece of data. The request data 206 may also include metadata. Such metadata may include a HyperText Transfer Protocol (HTTP) header, a session value, and other appropriate information. The metadata may also indicate the identity of the current tenant, or organization, on behalf of which the request 202 is being sent.

As mentioned above, the request 202 passes through an authentication component (e.g., 108, FIG. 1) that applies an authentication process 208, such as that provided by JAAS. The authentication process 208 creates principal data 210 and role data 212 to be associated with the request 202. The principal data 210 identifies the subject of the request. For example, the principal data 210 may identify specific user or an organization. The role data 212 defines the privileges held by the user or organization identified by the principal data 210. According to the present example, the principal data 210 identifies the user that is currently logged into the client component that sent the request 202. The role data 212 identifies the privileges of that specific user.

As mentioned above, the request 202 also passes through a filter component (e.g., 110, FIG. 2) that applies a filter process 214. As will be described in further detail below, the filter process determines the organization on behalf of which the request 202 is being sent. For example, the filter process 214 may identify the organization specified by the account switcher feature (e.g., 106, FIG. 1).

The filter process 214 then modifies both the principal data 210 and the role data 212 to create updated principal data 216 and updated role data 218. The updated principal data 216 identifies the organization on behalf of which the request is being sent instead of the user. The updated role data 218 indicates the privileges of the user within the identified organization. Different users may have different privileges on different organizations.

The request 202 is then passed to an authorization process 220, which may be part of a service component (e.g. 116, FIG. 1). The authorization process can then allow or disallow the requested operation based on the privileges identified in the updated role data 218. The service component may receive a plurality of requests with updated principal data identifying the same organization. But, because different users acting on behalf of that organization may have different privileges within that organization, the plurality of requests may have different sets of privileges in their respective role data while identifying the same organization. Thus, the service component is not concerned with the underlying structure. It simply uses the updated role data to determine the appropriate authorization for the request 202.

Figure 3:
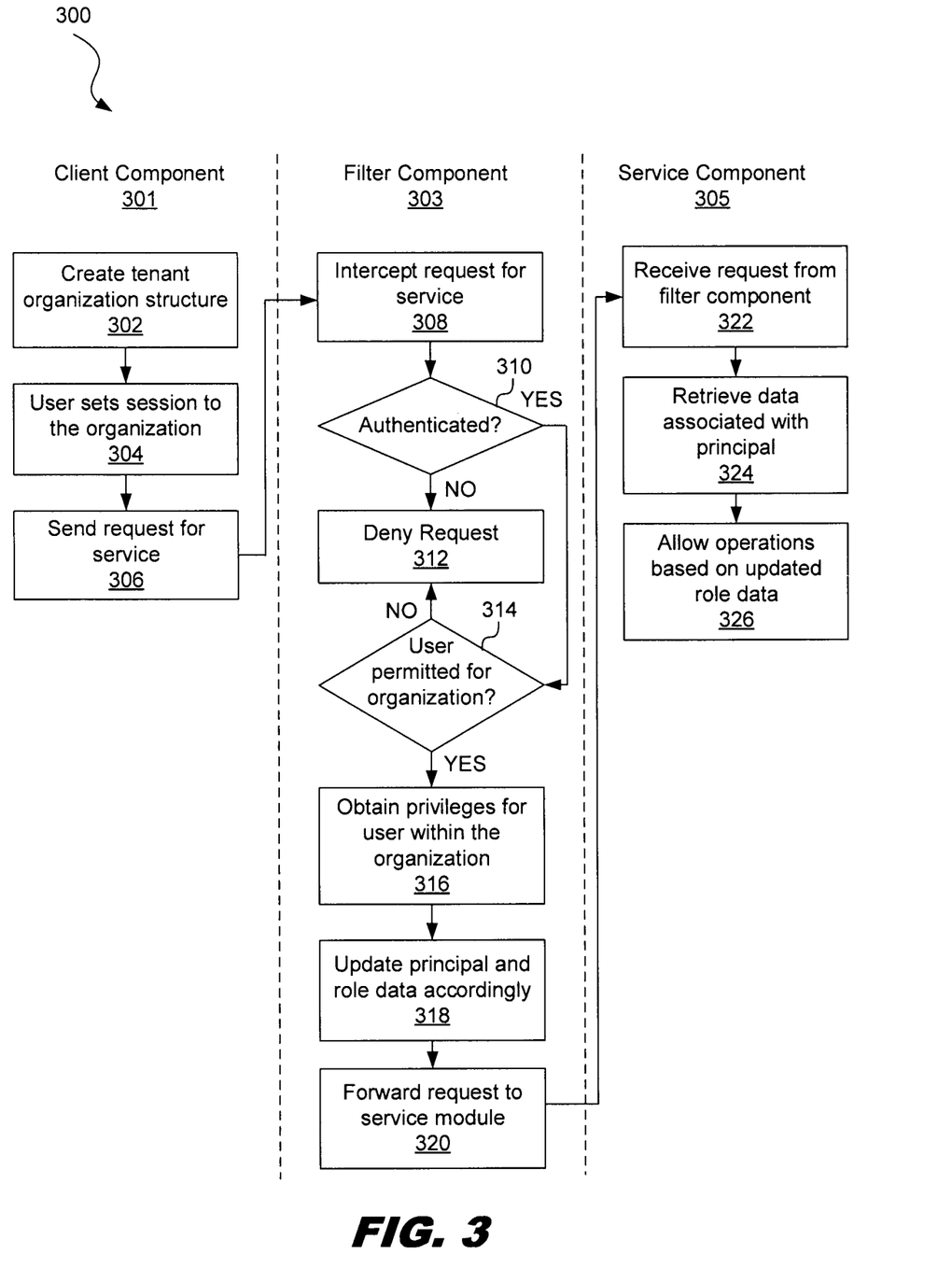
FIG. 3 is a flowchart showing an illustrative method for managing a request sent from a client component of the enterprise application to a service component of the enterprise application, according to one example of principles described herein.

FIG. 3 is a flowchart showing an illustrative method 300 for managing a request sent from a client component of the enterprise application to a service component of the enterprise application. The method 300 is shown as steps performed by the client component 301, steps performed by the filter component 303, and steps performed by the service component 305.

At step 302, a tenant organization structure is created. For example, a user charged with creating the organization structure may log into the enterprise application. This user will be referred to as the super user. The super user may create a number of organizations and a number of sub organizations. The super user may also invite other users and assign those users privileges within the various organizations and sub organizations.

At step 304, a particular user sets the session to a particular organization. This may be done, for example, by using the account switcher feature (e.g., 106, FIG. 1). The particular user will be referred to as the session user and the particular organization will be referred to as the session organization. By setting the session to a particular organization, all requests sent by the session user will be sent on behalf of the session organization. If the session user does not set a session organization, then all requests will be sent on behalf of the session user, and not an organization.

At step 306, the client component 301 sends a request for service to a service component 305. The request is associated with both the session user and the session organization. Specifically, the authentication data (e.g., 204, FIG. 2) may identify the session user and the request data may identify the session organization. At step 308, the filter component 303 intercepts the request for service. In the present example, the filter component 303 includes an authentication component (e.g., 108, FIG. 1).

At step 310, an authentication process is applied to determine whether the request is authenticated. If it is determined that the request is not authenticated, then the request is denied at step 312. For example, the request may be terminated with a "forbidden" HTTP status. If, however, the request is authenticated, the method 300 proceeds to step 314.

At step 314, filter component 303 determines whether the session user is permitted to perform any requests on behalf of the currently identified tenant. If the user did not set the session to a session organization, then the current tenant is the user. If, however, the user used the account switcher feature to select a session organization, then the tenant is the session organization. In such a case, the filter component 303 determines whether the session user has any privileges with the session organization. If the user does not have any privileges with the session organization, then the method 300 proceeds to step 312, at which the request is denied. If, however, the filter component 303 determines that the user does have some privileges for the session organization, the method proceeds to step 316.

At step 316, the filter component 303 obtains set of privileges for the user within the session organization. This may be obtained, for example, from the authentication database (e.g., 118, FIG. 1). The full set of privileges defines what resources the session user may access on behalf of the session organization. The privileges also determine what operations can be performed on such resources by the session user behalf of the session organization.

At step 318, the filter component 303 updates the principal data (e.g., 210, FIG. 2) and the role data (e.g., 212, FIG. 2) accordingly. Specifically, the principal data is updated to reflect the current tenant. Thus, if the user is acting on behalf of the session organization, the principal data is updated to identify the organization rather than the user. Additionally, the role data is updated to reflect the set of privileges that the session user has within the session organization. Then, the request is forwarded to the service component 305 at step 320. At this point, the request includes the updated principal data (e.g., 216, FIG. 2) and the updated role data (e.g., 218, FIG. 2).

At step 322 the service component 305 receives a request from the filter component 303. Then, at step 324, the service component 305 retrieves data (i.e., resources) associated with the subject identified by the updated principal data. For example, if the subject is the user, then the service component 305 retrieves data associated with that user. If the subject is the session organization, then data belonging to that session organization is retrieved. The service component 305 can then perform operations on that data. The service component 305 first determines whether such operations are allowed based on the updated privilege data.

In this manner, service component 305 does not have to be concerned about the underlying tenant organization structure. Instead, the service component 305 simply performs requested operations according to the updated principal and updated role data. This allows for simpler design of the service components and thus a reduced likelihood of vulnerabilities.

Figure 4:
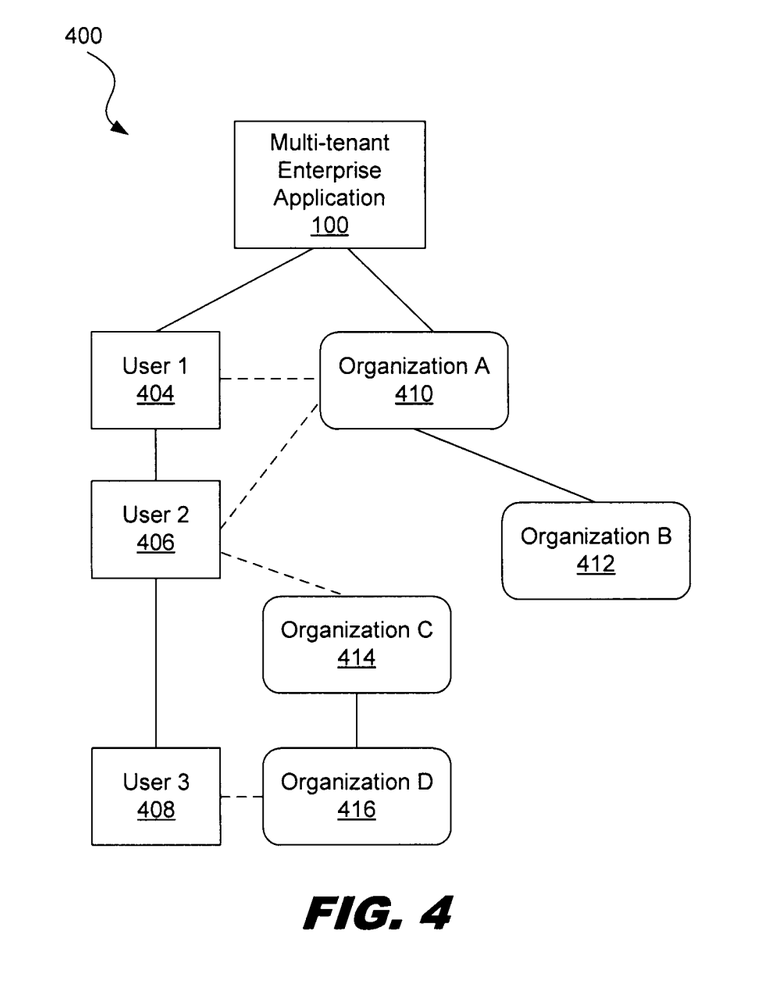
FIG. 4 is a diagram showing an illustrative nested multi-tenant model that may be used by the enterprise application, according to one example of principles described herein.

FIG. 4 is a diagram showing an illustrative nested multi-tenant model 400 that may be used by the enterprise application 100. According to the present example, a first user 404 logs into the multi-tenant enterprise application 100. The first user 404 then creates Organization A 410. The first user 404 is the super user for Organization A 410. Organization A 410 then creates organization B 412. In one example, this may be done as the first user 404, while acting on behalf of organization A 410 creates organization B 412. Thus, the first user 404 is indirectly the super user of organization B 412. Additionally, the first user 404 invites a second user 406 to the enterprise application 100. The first user 404 may assign the second user 406 as an administrator of organization A 410. In other words, the second user 406 has administrator privileges, but not super user privileges, for Organization A 410. Thus, the second user 406 is indirectly an administrator of organization B 412.

The second user 406 may also create organization C 414. Thus, the second user 406 is the super user of Organization C 414. Organization C 414 then creates organization D 416. In one example, this may be done as the second user 406, while acting on behalf of organization C 414, creates organization D 416. Thus, the second user 406 is indirectly the super user of organization D 416. Additionally, the second user 406 invites a third user 408 to the enterprise application 402. The second user 406 may give the third user 408 auditor privileges for organization D 416. Thus, the third user 408 has only auditor privileges for organization D 416 and does not have any privileges for the other organizations 410, 412, 414. The various organizations 410, 412, 414, 416 may correspond to real-world organizations or departments within an organization. For example, the organizations 410, 412, 414, 416 may correspond to accounting or IT departments within a company.

With this model, the first user 404 may use the account switcher feature (e.g., 106, FIG. 1) to set the session organization to Organization A 410. The first user 404 may then send a request to the service component. Because the first user 404 has super user privileges for Organization A, the first user 404 is authorized to perform any operation on behalf of Organization A. Thus, the updated principal data for requests will identify Organization A 410 and the updated role data will indicate super user privileges. Furthermore, the second user 406 may use the account switcher feature to set Organization A 410 as the session organization. The second user 406 may then send a request to a service component on behalf of Organization A 410. In this case, the updated principal data also indicates Organization A 410, but the updated role data indicates administrator privileges.

While the first user 404 has super user privileges for Organization A 410, the first user 404 does not have any privileges for Organization C 414 or Organization D 416. Thus, if the first user 404 sets the session organization as Organization C 414 or Organization D 416, then any requests sent to the service component will be denied because the filter component will determine that the first user 404 does not have any privileges in Organization C 414 or Organization D 416.

Figure 5:
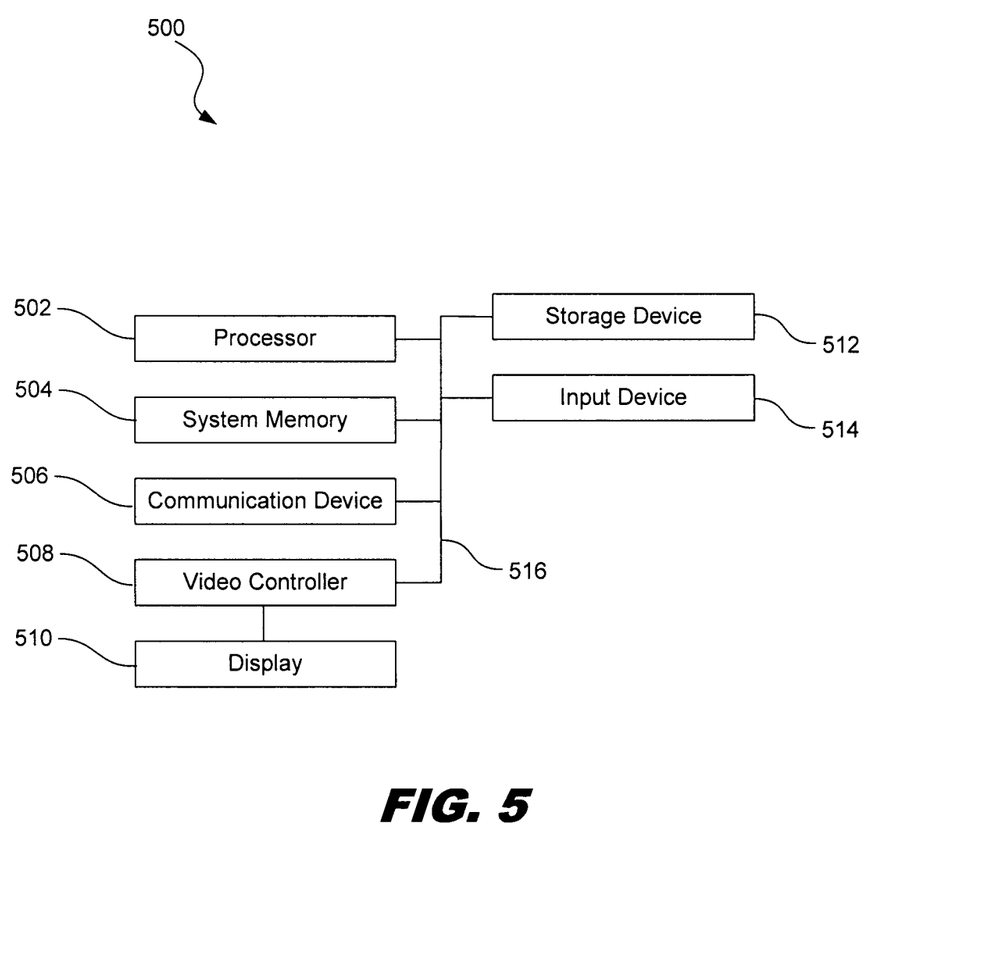
FIG. 5 is a diagram showing an illustrative computing system that may be used to manage requests sent from the client component to the service component, according to one example of principles described herein.

FIG. 5 is a diagram showing an illustrative computing system 500 that may be used to manage requests sent from the client component to the service component. The computing system 500 described below may be used for the client component, the authentication component, the filter component, or the service component described above. According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, hard disk, a magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
   receiving from a client component of an enterprise application, a request destined for a service component of the enterprise application, the request comprising authentication data and request data, the authentication data being associated with a current user of the client component, the user associated with an organization, the request data including metadata that indicates an identity of an organization on behalf of which the request is being sent, wherein the client component provides an account switching feature, the account switching feature allowing the user to select an organization on behalf of which requests are to be sent;
   using an authentication database, performing an authentication process to create principal data and role data associated with the request, the principal data identifying the user;
   after performing the authentication process, identifying the organization on behalf of which the request is being sent;
   obtaining, from the authentication database, a set of privileges for the user within the identified organization, the set of privileges defining what resources the user may access on behalf of the identified organization;

replacing the principal data with updated principal data based on the set of privileges obtained from the authentication database, the updated principal data replacing an identifier of the user with an identifier of the identified organization;

updating the role data associated with the request to create updated role data that includes the set of privileges for the user within the identified organization, the updated role data being based on the set of privileges obtained from the authentication database; and forwarding the request to the service component, wherein the forwarding occurs after updating both the principal data and the role data.

2. The method of claim 1, further comprising, wherein the replacing the principal data and the updating the role data is in response to determining that the user is authorized to perform requests on behalf of the identified organization.

3. The method of claim 1, wherein updating the role data comprises retrieving data from a database that associates user roles within organizations.

4. The method of claim 1, further comprising, with the client component, providing a user interface feature for creating organizations and assigning users to such organizations.

5. The method of claim 1, further comprising, with the service component, retrieving data associated with the identified organization.

6. The method of claim 5, further comprising, with the service component performing an authorization process using the updated role data and the updated principal data to determine which operations associated with the request data are allowed.

7. The method of claim 1, wherein the enterprise application uses a nested multi-tenant model that is transparent to the service component.

8. The method of claim 7, wherein the nested multi-tenant model includes organizations and sub-organizations, wherein different users have different privileges within different organizations.

9. The method of claim 1, wherein the principal data identifies a subject of the request.

10. The method of claim 1, wherein the updated principal data reflects a current tenant of the enterprise application.

11. The method of claim 1, wherein the authentication process utilizes a Java Authentication and Authorization Service framework.

12. A computing system comprising:
a processor; and
a memory, the memory comprising machine readable instructions that when executed by the processor, cause the system to:
receive from a client component of an enterprise application, a request destined for a service component of the enterprise application, the request comprising authentication data and request data, the authentication data being associated with a current user of the client component, the user associated with an organization, the request data including metadata that indicates an identity of an organization on behalf of which the request is being sent, wherein the client component provides an account switching feature, the account switching feature allowing the user to select an organization on behalf of which requests are to be sent;
using an authentication database, perform an authentication process to create principal data and role data associated with the request, the principal data identifying the user;
after performing the authentication process, identify the organization on behalf of which the request is being sent;
obtain, from the authentication database, a set of privileges for the user within the identified organization, the set of privileges defining what resources the user may access on behalf of the identified organization;
replace the principal data with updated principal data based on the set of privileges obtained from the authentication database, the updated principal data replacing an identifier of the user with an identifier of the identified organization;
update the role data associated with the request to create updated role data that includes the set of privileges for the user within the identified organization, the updated role data being based on the set of privileges obtained from the authentication database; and
forward the request to the service component, wherein the forwarding occurs after updating both the principal data and the role data.

13. The system of claim 12, wherein the machine readable instructions further cause the system to replace the principal data and the update the role data in response to determining that the user is authorized to perform requests on behalf of the identified organization.

14. The system of claim 12, wherein to update the role data, the machine readable instructions further cause the system to retrieve data from a database that associates user privileges within organizations.

15. The system of claim 12, wherein the machine readable instructions further cause the system to provide an Application Programming Interface (API) for a service component, the API configured to allow the service component to determine a user associated with the request.

16. The system of claim 12, wherein the machine readable instructions further cause the system to deny the request in response to determining that the user does not have the privilege to perform an operation associated with the request data on behalf of the identified organization.

17. The system of claim 12, wherein the machine readable instructions provide an Application Programming Interface (API) for the client component to provide data indicating user privileges in association with organizations.

18. A method comprising:
receiving a request from a client component of an enterprise application, the request comprising authentication data and request data, the authentication data being associated with a current user of the client component, the user associated with an organization, the request data including metadata that indicates an identity of an organization on behalf of which the request is being sent, wherein the client component provides an account switching feature, the account switching feature allowing the user to select an organization on behalf of which requests are to be sent;
using an authentication database and authentication data created from an authentication process, the authentication data including principal data and role data associated with the request, the principal data identifying the user;
after performing the authentication process, identifying the organization on behalf of which the request is being sent;
obtaining, from the authentication database, a set of privileges for the user within the identified organization, the set of privileges defining what resources the user may access on behalf of the identified organization;

replacing the principal data with updated principal data based on the set of privileges obtained from the authentication database, the updated principal data replacing an identifier of the user with an identifier of the identified organization;

updating the role data associated with the request to create updated role data that includes the set of privileges for the user within the identified organization, the updated role data being based on the set of privileges obtained from the authentication database; and forwarding the request to a service component, wherein the forwarding occurs after updating both the principal data and the role data.

19. The method of claim 18, further comprising, wherein the replacing the principal data and the updating the role data is in response to determining that the user is authorized to perform requests on behalf of the identified organization.

\* \* \* \* \*